United States Patent
Tanaka

(10) Patent No.: US 6,239,199 B1
(45) Date of Patent: May 29, 2001

(54) RESIN COMPOSITION RESIN MOLDING AND METHOD FOR INHIBITING POLYMERIZATION OF VINYL COMPOUND

(75) Inventor: Kazumi Tanaka, Niigata-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/172,197

(22) Filed: Oct. 14, 1998

(30) Foreign Application Priority Data

Oct. 16, 1997 (JP) .................................................... 9-283637
Mar. 19, 1998 (JP) .................................................. 10-070449

(51) Int. Cl.[7] ................................ C08J 5/10; C08K 5/46; C08L 27/06
(52) U.S. Cl. ................................ 524/83; 526/82; 526/83; 526/84; 526/85
(58) Field of Search ................ 526/82–85; 261/94, 261/95, 96, 97, 98, 99; 524/83

(56) References Cited

U.S. PATENT DOCUMENTS 5,763,545 * 6/1998 Takano et al. ........................ 526/82

FOREIGN PATENT DOCUMENTS

| 2930757 | 2/1980 | (DE) . |
| 0172427 | 2/1986 | (EP) . |
| 0207161 | 1/1987 | (EP) . |
| 824521 | 12/1959 | (GB) . |
| WO92/0679 | 4/1992 | (WO) . |

OTHER PUBLICATIONS

Patent Abstracts of Japan, Publication No. 52098081, Publication Date: Aug. 17, 1777, (for Application No. 51015225, Application Date: Feb. 14, 1776).

Patent Abstracts of Japan, Publication No. 60018508, Publication Date: Jan. 30, 1885 (for Application No. 58125767, Application Date: Jul. 11, 1983).

Patent Abstracts of Japan, Publication No. 08090740, Publication Date: Apr. 9, 1996, (for Application No. 06231355, Application Date: Sep. 27, 1994).

"In hibition and retardation in radical polymerization", C.H. Bamford, pp. 1–21, in Aggarwal, et al., *Comprehensive Polymer Science*, 1st Supplement (XP002089478).

* cited by examiner

*Primary Examiner*—Samuel A. Acquah
*Assistant Examiner*—U. K. Rajguru
(74) *Attorney, Agent, or Firm*—Antonelli, Terry, Stout & Kraus, LLP

(57) ABSTRACT

Disclosed are a resin composition for inhibiting polymerization of a vinyl compound, which includes a resin and 0.1 to 30% by weight based on the resin, of a polymerization inhibitor for the vinyl compound; a resin molding for inhibiting polymerization of a vinyl compound, and a packing for inhibiting polymerization of a vinyl compound in a distillation tower, the resin molding and packing each including this resin composition. Also disclosed are methods for inhibiting polymerization of a vinyl compound, which include contacting the vinyl compound with the resin composition; these methods include processes of inhibiting polymerization of a vinyl compound in a distillation tower, by contacting the vinyl compound in the distillation tower with packing therein which includes this resin composition. By using the resin composition as a construction material of an inner wall of a reactor, distillation equipment and piping and as packing in the distillation tower, to inhibit polymerization of the vinyl compound, the vinyl compound can be produced stably by adding a small amount of the polymerization inhibitor for the vinyl compound without adding a large amount thereof.

10 Claims, No Drawings

RESIN COMPOSITION RESIN MOLDING AND METHOD FOR INHIBITING POLYMERIZATION OF VINYL COMPOUND

BACKGROUND OF THE INVENTION

1. Field of the Invention

The present invention relates to a resin composition, a resin molding and a method for inhibiting polymerization of a vinyl compound, and particularly to a method for inhibiting polymerization in a distillation process using a distillation tower containing packing upon a production of a vinyl compound in order to prevent a polymerizate from producing and to conduct the distillation smoothly and cost-effectively.

2. Description of the Related Art

A vinyl compound is polymerizable compound having a double bond. The polymerization is initiated by a radical induced by light, heat, a peroxide or the like, an ionic substance, a metal complex or the like. A diversity in the polymerization initiation means that undesirable polymerization, i.e., early polymerization is initiated by various triggers. The fact has been a great technical problem upon a production and a preservation of the vinyl compound.

In a method for producing the vinyl compound, distillation using a distillation tower containing packing, which is a normal refining step to obtain a high purity vinyl compound, is a step wherein polymerization is most likely to occur. Specifically, polymerization is most likely to occur at an inside of the distillation tower such as a steam condensing part and a residence part of the condensate. Accordingly, many efforts have been made and many ideas have been introduced.

For example, the following are disclosures concerning methacrylic acid, acrylic acid and esters thereof.

The inside of the distillation tower is occupied with a vapor mainly including the vinyl compound and the condensate thereof. In order to prevent polymerization in the distillation tower, a polymerization inhibitor that vaporizes together with the vinyl compound, i.e., the polymerization inhibitor having a high vapor pressure is preferable. Japanese Patent Application Laid-Open No. Showa 50(1975)-64214, No. Heisei 2(1990)-17151 and No. Heisei 7(1995)-316093 disclose a use of a combination of a polymerization inhibitor having a low vapor pressure for preventing polymerization of a crude liquid and the polymerization inhibitor having a high vapor pressure. The polymerization inhibitors are taken into a product. If an excess amount of polymerization inhibitors are used for fear of the polymerization, then the purity of the product is tend to be lowered or the quality of the product is tend to be deteriorated due to coloring caused by polymerization inhibitors. The excess amount of polymerization inhibitors in the product are also undesirable for producing a polymer using the vinyl compound as a raw material. When the vapor drifts in a short path in the distillation tower containing the packing, the residence part is formed in the distillation tower and the polymerization inhibitors never be introduced into the residence part. Accordingly, providing the polymerization inhibitor having the high vapor pressure is meaningless.

Japanese Examined Patent Publication No. Showa 50(1975)-6449, Japanese Patent Application Laid-Open No. Showa 49(1974)-85016, No. Showa 50(1975)-101313, No. Showa 59(1984)-7147, No. Showa 64(1989)-9957, No. Showa 64(1989)-42443, No. Showa 64(1989)-66140, No. Heisei 2(1990)-248402 and No. Heisei 7(1995)-53449 disclose a method for allowing a gas to exist which has a polymerization inhibiting effect such as oxygen, air, nitrogen oxide or a combination of such gases and a polymerization inhibitor in the distillation tower. Oxygen and air are very effective in view of less contamination of the product and cost efficiency. However, oxygen and air have less polymerization inhibiting effect themselves and are typically used in combination with an other polymerization inhibitor. Nitrogen monoxide may deteriorate the product and the polymerization inhibitor used therewith, and easily react with oxygen in the air into nitrogen dioxide having no polymerization inhibiting effect. Thus, the nitrogen monoxide involves a technical difficulty in handling. According to the method, similar to the former method using the polymerization inhibitor having a high vapor pressure, when the vapor drifts in a short path in the distillation tower containing the packing, the polymerization inhibiting effect for the residence part formed is no more expected.

Japanese Examined Patent Publication No. Showa 50(1975)-6449 and Japanese Patent Application Laid-Open No. Heisei 2(1990)-193944 disclose a method for spraying a polymerization inhibitor dissolved in a vinyl compound from a top of a distillation tower. According to the method, a high polymerization inhibiting effect is expected. However, there is economical problems that an expensive polymerization inhibitor should be provided continuously. In addition, it is required to distribute the polymerization inhibitor every nook and corners of an inside of the distillation tower. However, a dead space where the polymerization inhibitor does not reach is formed and no polymerization inhibiting effect is expected in the dead space.

Japanese Patent Application Laid-Open No. Showa 63(1988)-41514, No. Showa 63(1988)-41440 and No. Heisei 1(1989)-180850 disclose a method for lowering a residence amount of fine condensate of a vinyl compound on a surface of a metal to inhibit an adhesion of a polymer to an inner surface of distilling equipment by a smoothing with an electrolytic polishing, a mechanical polishing, a surface treatment with nitric acid or the like. The method does not inhibit polymerization but avoid polymerization. Therefore, no great advantage is expected.

Other examples of the disclosure include a use of an empty distillation tower without packing, retarded numbers of stages for refining, a use of a thin film distillation tower having a few heat history disclosed in Japanese Patent Application Laid-Open No. Showa 62(1987)-201852 and distillation under high vacuum to decrease temperature. Some of the methods sacrifice for purity of a product to some extent, or urge economical burdens on facility and operation. Accordingly, distillation using a distillation tower containing packing having required numbers of stages is accompanied by a serious risk and therefore has scarcely been utilized especially for the vinyl compound that is highly polymerizable, although such distillation tower is the most common and efficient refining means for obtaining a high purity product.

SUMMARY OF THE INVENTION

An object of the present invention is to provide a fundamental technique based on an entirely novel idea to solve the problems in the prior art described above.

Through intense studies by the present inventor for attaining the object, the present inventors discovered that a resin composition containing a polymerization inhibitor for a vinyl compound has sufficient polymerization inhibiting ability to the vinyl compound and that said composition is used as a construction material for inside walls of a reactor, distilling equipment or piping, for packing to be packed in a distillation tower and for a storage container, thereby solving the above-mentioned problems. The present invention has been accomplished based on such findings.

The present invention relates to (1) a resin composition for inhibiting polymerization of a vinyl compound, which composition comprises a resin and 0.1 to 30% by weight based on said resin, of a polymerization inhibitor for the vinyl compound, (2) a resin molding for inhibiting polymerization of a vinyl compound, which molding comprises a resin containing 0.1 to 30% by weight of a polymerization inhibitor for the vinyl compound, (3) packing for inhibiting polymerization of a vinyl compound in a distillation tower, wherein packing comprises the above resin composition or the resin molding, (4) a method for inhibiting polymerization of a vinyl compound, comprising the step of contacting the vinyl compound with the resin composition comprising a resin and 0.1 to 30% by weight based on said resin, of a polymerization inhibitor for the vinyl compound, and (5) a method for inhibiting polymerization of a vinyl compound, which comprises the step of contacting the vinyl compound with the packing in a distillation tower, said packing comprising the resin composition comprising a resin and 0.1 to 30% by weight based on said resin, of a polymerization inhibitor for the vinyl compound at the time of distilling the vinyl compound in the distillation tower.

DETAILED DESCRIPTION OF THE INVENTION

The present invention will be described below for detail.

According to the present invention, examples of a vinyl compound include methacrylic acids, acrylic acids, methacrylic esters, acrylic esters, acrylonitrile, methacrylonitrile, acrylamides, methacrylamides, styrene, maleic acid, vinyl acetate and the like. Concrete examples of acrylic esters and methacrylic esters include alkyl esters having an ester residue of methyl, ethyl, n-propyl, i-propyl, n-butyl, i-butyl, t-buityl, 2-ethylhexyl, latiryl or stearyl; esters including an aromatic ring, an alicyclic ring or a heterocyclic ring having an ester residue of benzyl, cyclohexyl, isobornyl, dicyclopentenyl, dicyclopentenylethyl or tetrahydrofurfuryl; esters having an ester residue of a fluorine atome; esters having an ester residue including an ether bond of methoxyethyl, ethoxyethyl or n-buthoxyethyl; esters having an ester residue including a hydroxy group of 2-hydroxyethyl, 2-hydroxypropyl, 2-hydroxy-3-chloropropyl, 2-hydroxybutyl or 4-hydroxybutyl; esters having an ester residue including an epoxy residue of glycidyl or mechylgrycidyl; esters having an ester residue including a carbolxyl group of β-carboxyethyl; esters having an ester residue including a sulfonic group; esters having an ester residue including an alkylamino group of dimethylaminoethyl or diethylaminoethyl; esters having an ester residue including a cationic group; esters having an ester residue including a double bond of vinyl or allyl; esters having an ester residue including a silicon atom; ester having an ester residue including an isocyanate group of 2-isocyanatoethyl, 2-isocyanatopropyl, 2-methyl-2-isocyanatoethyl or 4-isocyanatobutyl; esters having an ester residue including a phosphoric group; esters having an ester residue including an acetoacethyl group and the like.

The present invention is particularly effective for methacrylic acid, methacrylic esters, acrylic acid and acrylic esters that are easily polymerized among the above-described vinyl compounds.

According to the present invention, the molding comprising the resin composition containing the polymerization inhibitor such as packing of the distillation tower can be obtained through various methods. In the case where the resin is, for example, a paint, the polymerization inhibitor is well dispersed in the paint to dry and solidify the paint with an ordinary method or the paint is applied to a packing made of any material to be dried and solidified. In the case where the resin is a thermoplastic resin, the polymerization inhibitor and the resin are mixed to be subjected to melt molding using an appropriate extruder or injection machine. In the case that a common solvent coexists with the polymerization inhibitor and the resin, the polymerization inhibitor and the resin are dissolved in the solvent and mixed to eliminate the solvent and to mold into an appropriate shape. In the case that no melting or dissolution can be conducted, the polymerization inhibitor and the resin are mixed to be subjected to compression molding.

According to the present invention, the resin containing the polymerization inhibitor for the vinyl compound is desirably substantially chemically inert under actual working conditions when the resin is contacted with the vinyl compound. Specifically, the resin desirably does not deteriorate, alter or polymerize the vinyl compound, and also is not lowered in its strength, altered or deteriorated by the vinyl compound. As another desirable property, the resin should have heat resistance. In other words, the resin should have thermostability at a working temperature to be stable in a reactor, distillation equipment and piping. In the case that the resin containing the polymerization inhibitor is, for example, a crystalline thermoplastic resin, the resin should have a melting point of not less than the working temperature. In the case of the resin being amorphous or sparingly crystalline, the resin should have a glass transition temperature (Tg) of not less than the working temperature. However, when the resin containing the polymerization inhibitor is obtained through the melt molding, inactivation occurs due to alternation or deterioration of the polymerization inhibitor if a molding temperature of the resin is too high. Therefore, the resin having a too high molding temperature is not preferable. The molding temperature of the resin by the melt molding is preferably 300° C. or less in view of the above reason, depending on heat resistance of the polymerization inhibitor.

The resin used in the present invention has preferably excellent mechanical properties. For example, when the resin is used for the piping or the packing to be packed in the distillation tower, the resin should have sufficient mechanical strength at a working temperature.

The appropriate resin is not unequivocally defined because it depends on types and conditions of the vinyl compound intended. The resin can be selected easily and quickly by immersing it in the vinyl compound for a predetermined time at a higher temperature than an actual working temperature, observing a status after the immersion, measuring altered properties and analyzing the components of the vinyl compound. The resin has various types such as a coating type, a thermoplastic type, a thermosetting type or the like. Typically, polyolefin such as low density polyethylene, high density polyethylene, ethylene-propylene random copolymer, ethylene-propylene block copolymer, homo type polypropylene, polybutene-1 and poly-4-methyl pentene-1, a fluororesin such as polytetrafluoroethylene, polytrifluorochloroethylene, polyvinyl fluoride and polyvinylidene fluoride or the like can be preferably used.

Other resins, for example, polyester such as polyethylene terephthalate, polybutylene terephthalate and polyethylene naphtalate; unsaturated polyester; polyamide such as nylon 6, nylon 6,6, nylon 4,6, nylon 6,10 and nylon MXD6; polycarbonate such as dioxydiphenylethanecarbonate, dioxydiphenyl-2,2-propanecarbonate, dioxydiphenyl-1,1-ethanecarbonate; polyether such as polyoxymethylene and polytetramethylethyleneoxide may be preferably used because these resins have high heat resistance and an excellent mechanical property only if no chemical change occurs upon a contact with the vinyl compound. These resins are used alone or in combination.

A polymerization stabilizer such as a polymerization terminator and a polymerization retarder may remain in the resin upon polymerization or an additive such as a coloring inhibitor and a oxidation inhibitor may be added to the resin in advance as long as the advantages of the present invention are achieved.

The polymerization inhibitor for the vinyl compound contained in the resin used for the present invention has not only an excellent polymerization inhibiting effect to the vinyl compound, but also no substantial chemical change upon a contact with the resin under the actual working conditions. Specifically, the polymerization inhibitor does not alter or deteriorate the resin and also is not altered or deteriorated by the resin.

The melting point of the polymerization inhibitor is desirably the actual working temperature or more. However, the melting point may be lower than the actual working temperature. The polymerization inhibitor may or may not be dissolved in the vinyl compound under the actual working conditions. Or both types of the polymerization inhibitor may be used together. A selection of the polymerization inhibitor is naturally determined by the quality of the objective vinyl compound, i.e., a permissive amount of the inhibitor contained in the vinyl compound, and by a desired polymerization inhibiting period. A run and an outflow of the polymerization inhibitor in and on the resin is permitted as long as it does not affect the mechanical properties thereof.

The appropriate polymerization inhibitor is not unequivocally defined because it depends on types and conditions of the vinyl compound intended. The polymerization inhibitor can be selected easily and quickly by immersing the resin containing the polymerization inhibitor into the vinyl compound at a higher temperature than the actual working temperature, observing a status after the immersion, measuring the polymerization time of the vinyl compound or analyzing the components of the vinyl compound. Typical polymerization inhibitor includes a phenol type such as hydroquinon, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-t-butylphenol), 4,4'-thiobis(3-methyl-6-t-butylphenol); a thioether type such as phenothiazine, distearylthiodipropionate; an amine type such as p-phenylenediamine, 4-aminodiphenylamine, N,N'-diphenyl-p-phenylenediamine, N-i-propyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-β-naphthylamine, 4,4'-dicumyldiphenylamine, 4,4'-dioctyl-diphenylamine; a nitoroso compound such as N-nitorosodiphenylamine, N-nitorosophenylnaphthylamine, N-nitorosodinaphtylamine, p-nitorosophenol, nitorosobenzene, p-nitorosodiphenylamine, α-nitoroso-β-naphtol; a nitrite such as ammonium nitrite, sodium nitrite, potassium nitrite, copper nitrite, iron nitrite, trimethylammonium nitrite, n-hexyl nitrite, 1-octyl nitrite and ester thereof; nitroxide such as piperidine-1-oxyl, pyrrolidine-1-oxyl, 2,2,6,6-tetramethyl-4-oxopiperidine-1-oxyl, 2,2,6,6-tetramethylpiperidine-1-oxyl; a copper salt such as copper dimethyldithiocarbamate, copper diethyldithiocarbamate, copper dibutyldithiocarbamate, copper acetate, copper salicylate, copper thiocyanate, copper sulfate and copper chloride; a chromium compound such as chromium acetate and chromium oxide; a thiourea compound such as thiourea, 1,3-dimethylthiourea, 1,3-diethylthiourea, 1,3-di-i-propylthiourea, 1,3-dibutylthiourea and dimethylolthiourea; iodine, iodide such as lithium iodide, sodium iodide, potassium iodide, cesium iodide, calcium iodide and titanium iodide; bromide such as lithium bromide, sodium bromide, potassium bromide and cesium bromide or the like. These polymerization inhibitors are used alone or in combination.

A content of the polymerization inhibitor in the resin is selected in the range so that the resin can be molded and therefore is not especially limited. However, if the content is too little, polymerization is insufficiently inhibited. On the other hand, if the content is too much, the resin composition has less mechanical strength. Accordingly, a suitable range exists. The resin should contain 0.1 to 30% by weight, preferably 0.2 to 20% by weight, more preferably 0.5 to 10% by weight of the polymerization inhibitor.

When a method for inhibiting polymerization of the present invention is conducted in, for example, a reactor, the resin composition containing the polymerization inhibitor for the vinyl compound is characteristically contacted with the vinyl compound. According to the present invention, the resin molding for inhibiting polymerization of the vinyl compound exists in the reactor. The polymerization inhibitor effective for the vinyl compound may be dissolved in a reaction liquid in advance or may be provided during the reaction, and a gas (i.e., oxygen, air) having a polymerization inhibiting effect may be provided together therewith. When the method is conducted in distillation equipment, the resin composition containing the polymerization inhibitor for the vinyl compound, especially packing comprising the resin composition in a distillation tower, is characteristically contacted with the vinyl compound. According to the present invention, the distillation tower is packed with the resin molding for inhibiting polymerization of the vinyl compound. The polymerization inhibitor effective for the vinyl compound may be provided and allowed to exist in a substantial form of a gas (i.e., oxygen, air) or vapor (in the case of the polymerization inhibitor having the high vapor pressure), or the polymerization inhibitor effective for the vinyl compound may be dissolved in the vinyl compound and provided from a top of the distillation tower. The polymerization inhibitor used for this purpose may be same or different with/from the polymerization inhibitor contained in the resin.

The resin composition for inhibiting polymerization of the vinyl compound and the molding comprising the resin composition of the present invention can be utilized for an inner wall of the reactor, the distillation equipment and the piping for producing the vinyl compound, for packing of the distillation tower or for a container storing the vinyl compound. The method for inhibiting polymerization of the vinyl compound of the present invention can be used for a reaction, distillation or transportation of the vinyl compound or a storage of the vinyl compound.

As described above, (i) by using the resin composition for inhibiting polymerization of the vinyl compound of the present invention as a construction material of the inner wall of the reactor, the distillation equipment and the piping and the packing of the distillation tower, the vinyl compound can be produced stably by adding a small amount of the polymerization inhibitor for the vinyl compound without adding a large amount of the polymerization inhibitor for the vinyl compound differently from prior methods. Even in a dead space in the equipment where the polymerization inhibitor does not reach, the polymerization can be prevented effectively. Further, the polymerization inhibitor for the vinyl compound can be easily separated from the vinyl compound because the polymerization inhibitor for the vinyl compound exists in the resin. (ii) By allowing the resin molding for inhibiting polymerization of the vinyl compound according to the present invention to exist as an inner wall or packing of the distillation tower in a gaseous phase, there is no need to use the polymerization inhibitor having a high vapor pressure, thereby preventing contamination of a product caused by the polymerization inhibitor for the vinyl compound. (iii) By using the packing for the distillation tower of the present invention, there is no need to spray a large amount of the polymerization inhibitor dissolved in the vinyl compound from a top of the distillation tower, thereby retarding the use of an expensive polymerization inhibitor. (iv) By using a container made of the resin molding for inhibiting polymerization of the vinyl compound according to the present invention to store the vinyl compound, there is no need to add the polymerization inhibitor for the vinyl compound for the purpose of preventing polymerization in storage. The polymerization inhibitor for the vinyl compound is easily separated from the vinyl compound because the polymerization inhibitor exists in the resin. (v) When the vinyl compound is distilled or stored by a method for inhibiting polymerization of the present invention, a polymerization inhibiting effect for the vinyl compound continues longer than using the polymerization inhibitor for the vinyl compound as such. (vi) According to a method for inhibiting polymerization of the present invention, distillation refining can be conducted using a distillation tower with a required numbers of stages, thereby producing a high purity product efficiently. (vii) According to a method for inhibiting polymerization of the present invention, there is no need to use special separation equipment such as thin film distillation equipment that is used inevitably for inhibiting polymerization, thereby improving productivity.

Examples of the present invention and Comparative Examples are given below by way of illustration of the present invention, and are not in any way designed to limit its scope.

A polymerization test for 2-hydroxyethyl methacrylate (hereinafter referred to as 2-HEMA) that is especially highly olymerizable among the vinyl compounds was conducted upposing a residence part in an inner portion of a reactor, distillation equipment and piping.

EXAMPLE 1

Preparation of a Resin Containing a Polymerization Inhibitor

Polypropylene (manufactured by Mitsubishi Chemical Corporation, under the trade name of FY-6C; hereinafter referred to as PP) was mixed with phenothiazine (manufactured by Kawaguchi Chemical Industry Co., Ltd. under the trade name of Antage TDP) as the polymerization inhibitor at a phenothiazine concentration of 5%, and the mixture was melted in a melting furnace (a diameter of about 9.5 mm, a length of 152 mm) with a nozzle having a diameter of about 2 mm at 180° C. for 2 minutes, then extruded and air-cooled to obtain a strand. The strand was cut into some pieces, ultrasonic cleaned with acetone for 30 minutes and vacuum dried at room temperature for 2 hours.

[Polymerization Test]

To a transparent glass test tube (a length of 150 mm, an inside diameter of 12.6 mm, an outside diameter of 15 mm) were added 0.2 g of the resultant PP containing the polymerization inhibitor and 9.5 g of 2-HEMA. The PP containing the polymerization inhibitor floated at an upper portion of a test liquid in the test tube and the content of a gaseous phase was about 7 cc. The test tube was sealed and immersed in an oil bath at 135° C. to measure a polymerization time. The polymerization was acknowledged when at least one part of the test liquid was solidified or when the test liquid was changed opaque in white upon dropping to acetone. The results are shown in Table 1.

EXAMPLE 2

The resin was prepared and polymerized in the same manner as Example 1 except that N,N'-diphenyl-p-phenylenediamine (manufactured by Kawaguchi Chemical Industry Co., Ltd. under the trade name of Antage DP) was used as the polymerization inhibitor. The results are also shown in Table 1.

COMPARATIVE EXAMPLE 1

To the test tube was added 10 g of 2-HEMA in the same manner as Example 1. The content of a gaseous phase in the test tube was about 7 cc. The test tube was sealed and immersed in the oil bath at 135° C. to measure a polymerization time. The results are also shown in Table 1.

TABLE 1

| | | Time (hr)* | |
|---|---|---|---|
| | Polymerization inhibitor | T1 | T2 |
| EXAMPLE 1 | Phenothiazine | 4.6 | 5.0 |
| EXAMPLE 2 | N,N'-diphenyl-p-phenylenediamine | 6.2 | 6.4 |
| COMPARATIVE EXAMPLE 1 | | 0.8 | 1.0 |

*T1: Time until which polymerization was not acknowledged
T2: Time at which polymerization was acknowledged As apparent from the results of EXAMPLES 1 and 2, and COMPARATIVE EXAMPLE 1 in Table 1, the resin molding for inhibiting polymerization of the vinyl compound according to the present invention is effective to inhibit the polymerization of 2-HEMA.

A polymerization test for glycidyl methacrylate (hereinafter referred to as GMA) that is also a highly polymerizable vinyl compound was conducted supposing a residence part in an inner portion of a reactor, distillation equipment and piping.

EXAMPLE 3

Preparation of a Resin Containing a Polymerization Inhibitor

PP was mixed with 2,2'-methylenebis(4-methyl-6-t-butylphenol) (manufactured by Kawaguchi Chemical Industry Co., Ltd. under the trade name of Antage W-400) as the polymerization inhibitor at a 2,2'-2'-methylenebis(4-methyl-6-t-butylphenol) concentration of 5%, and the mixture was melted in the melting furnace of EXAMPLE 1 at 180° C. for 2 minutes, then extruded and air-cooled to obtain a strand. The strand was cut into some pieces, ultrasonic cleaned with acetone for 30 minutes and vacuum dried at room temperature for 2 hours.

[Polymerization Test]

To a test tube were added 0.4 g of the resultant PP containing the polymerization inhibitor and 6.5 g of GMA in the same manner as EXAMPLE 1. The PP containing the polymerization inhibitor floated at an upper portion of a test liquid in the test tube and the content of a gaseous phase was about 10 cc. The test tube was sealed and immersed in the oil bath at 135° C. to measure a polymerization time. The polymerization was acknowledged when at least one part of the test liquid was solidified or when the test liquid was changed opaque in white upon dropping to methanol. The results are shown in Table 2.

EXAMPLE 4

Preparation of a Resin Containing a Polymerization Inhibitor

Poly4-methylpenten-1 (manufactured by Mitsui Chemical Co., Ltd. under the trade name of MX321XB; hereinafter referred to as TPX) was mixed with 2,2'-methylenebis(4-methyl-6-t-butylphenol) as the polymerization inhibitor at a 2,2'-metliylenebis(4-methyl-6-t-butylphenol) concentration of 5%, and the mixture was melted in the melting furnace of EXAMPLE 1 at 250° C. for 2 minutes, then extruded and air-cooled to obtain a strand. The strand was cut into some pieces, ultrasonic cleaned with acetone for 30 minutes and vacuum dried at room temperature for 2 hours.

[Polymerization Test]

To a test tube were added 1.0 g of the resultant TPX containing the polymerization inhibitor and 6.0 g of GMA in the same manner as EXAMPLE 1. The TPX containing the polymerization inhibitor floated at an upper portion of a test liquid in the test tube and the content of a gaseous phase was about 10 cc. The test tube was sealed and immersed in the oil bath at 135° C. to measure a polymerization time.

The polymerization was acknowledged when at least one part of the test liquid was solidified or when the test liquid was changed opaque in white upon dropping to methanol. The results are also shown in Table 2.

EXAMPLE 5

Preparation of a Resin Containing a Polymerization Inhibitor

Polyethylene terephthalate (manufactured by Nippon Unipet Co., Ltd. under the trade name of RT543C; hereinafter referred to as PET) was mixed with N,N'-diphenyl-p-phenylenediamine as the polymerization inhibitor at a N,N'-diphenyl-p-phenylenediamine concentration of 5%, and the mixture was melted in the melting furnace of EXAMPLE 1 at 280° C. for 2 minutes, then extruded and air-cooled to obtain a strand. The strand was cut into some pieces, ultrasonic cleaned with acetone for 30 minutes and vacuum dried at room temperature for 2 hours.

[Polymerization Test]

To a test tube were added 0.4 g of the resultant PET containing the polymerization inhibitor and 7.0 g of GMA in the same manner as EXAMPLE 1. The PET containing the polymerization inhibitor sank to a bottom portion of the test tube and the content of a gaseous phase was about 10 cc. The test tube was sealed and immersed in the oil bath at 135° C. to measure a polymerization time. The polymerization was acknowledged when at least one part of the test liquid was solidified or when the test liquid was changed opaque in white upon dropping to methanol. The results are also shown in Table 2.

EXAMPLE 6

Preparation of a Resin Containing a Polymerization Inhibitor

Polymethaxylyleneagipamide (manufactured by Mitsubishi Gas Chemical Company under the trade name of 6007; hereinafter referred to as N-MXD6) was mixed with N,N'-diphenyl-p-phenylenediamine as the polymerization inhibitor at a N,N'-diphenyl-p-phenylenediamine concentration of 5%, and the mixture was melted in the melting furnace of EXAMPLE 1 at 260° C. for 2 minutes, extruded and air-cooled to obtain a strand. The strand was cut into some pieces, ultrasonic cleaned with acetone for 30 minutes and vacuum dried at room temperature for 2 hours.

[Polymerization Test]

To a test tube were added 0.4 g of the resultant N-MXD6 containing the polymerization inhibitor and 7.0 g of GMA in the same manner as EXAMPLE 1. The N-MXD6 containing the polymerization inhibitor sank to a bottom portion of the test tube and the content of a gaseous phase was about 10 cc. The test tube was sealed and immersed in the oil bath at 135° C. to measure a polymerization time. The polymerization was acknowledged when at least one part of the test liquid was solidified or when the test liquid was changed opaque in white upon dropping to methanol. The results are also shown in Table 2.

COMPARATIVE EXAMPLE 2

To the test tube was added 7.3 g of GMA in the same manner as Example 1. The content of a gaseous phase in the test tube was about 10 cc. The test tube was sealed and immersed in the oil bath at 135° C. to measure a polymerization time. The results are also shown in Table 2.

TABLE 2

| | Polymerization inhibitor/resin | Time (hr)* T1 | T2 |
|---|---|---|---|
| EXAMPLE 3 | 2,2'-methylenebis(4-methyl-6-t-butylphenol)/PP | 30.0 | |
| EXAMPLE 4 | 2,2'-methylenebis(4-methyl-6-t-butylphenol)/TPX | 27.0 | |
| EXAMPLE 5 | N,N'-diphenyl-p-phenylenediamine/PET | 8.0 | 22.8 |
| EXAMPLE 6 | N,N'-diphenyl-p-phenylenediamine/N-MXD6 | 6.0 | 6.4 |
| COMPARATIVE EXAMPLE 2 | — | 0.8 | 1.0 |

*T1: Time until which polymerization was not acknowledged
T2: Time at which polymerization was acknowledged As apparent from the results of EXAMPLES 3 to 6 and COMPARATIVE EXAMPLE 2 in Table 2, the resin molding for inhibiting polymerization of the vinyl compound according to the present invention is effective to inhibit the polymerization of GMA.

Subsequently, a total reflux test for GMA was conducted supposing packing in a distillation tower.

EXAMPLE 7

Preparation of a Resin Containing a Polymerization Inhibitor

Polypropylene (manufactured by Chisso Corporation under the trade name of A5014) was mixed with N-isopropyl-N'-phenyl-p-phenylenediamine (manufactured by Kawaguchi Chemical Co., Ltd., under the trade name of Antage 3C) as the polymerization inhibitor at an N-isopropyl-N'-phenyl-p-phenylenediamine concentration of 2000 ppm, and the mixture was extruded from a die having a diameter of 3 mm at a resin temperature of 180° C. using a single screw extruder having a diameter of 30 mm.

Immediately after the extrusion, the extrudate was quenched and solidified in a water bath at 20° C. to obtain a strand having a diameter of about 5 mm wherein the polymerization inhibitor was contained uniformly. A resident time of the resin in the extruder was about 2 minutes and an extruded pressure was about 40 kg/cm$^2$.

[Total Reflux Test]

In the total reflux test, equipment consisting of a 500 cc three neck flask equipped with a thermometer and a capillary for providing air, a fractionating column (a total length of 398 mm, a packing part length of 315 mm, and an inside diameter of 18.4 mm), a cooling pipe, a trap cooled with methanol/dry ice and a vacuum pump. A material of the equipment contacted with a liquid was entirely made of glass, a coupling joint was a SPC joint. Heat was applied in an oil bath.

To the three neck flask was added 300 g of GMA containing 10000 ppm of 2,2'-methylenebis(4-methyl-6-t-butylphenol). The resultant PP strand containing the polymerization inhibitor was cut to 31 cm and 8 strands (36.5 g) were charged to the fractionating column. The oil bath was heated to 150° C. under a pressure of 90 torr at a top of the column. A temperature of a liquid phase was 125° C. to 130° C. and a temperature of a topmost fractionating column was 120° C. to 125° C. The time period needed from the time vapor reached a bottom of PP strand until the time polymerization was acknowledged at an area packed with the PP strand was measured. After 2 to 3 hours, a white polymerizate was acknowledged at a center of the area packed with the PP strand.

COMPARATIVE EXAMPLES 3

[Total reflux test]

Same equipment as EXAMPLE 7 was used. To the three neck flask was added 300 g of GMA containing 10000 ppm of 2,2'-methylenebis(4-methyl-6-t-butylphenol). The fractionating column was packed with 8 pipes (each having an outside diameter of 4 mm, an inside diameter of 2.6 mm and a length of 31 cm) of SUS316. The oil bath was heated under similar conditions to EXAMPLE 7. After 0.8 to 1 hour, a white polymerizate was acknowledged at a bottom of the area packed with the pipes.

EXAMPLE 8

Preparation of a Resin Containing a Polymerization Inhibitor

PP was mixed with N-isopropyl-N'-phenyl-p-phenylenediamine as the polymerization inhibitor at an N-isopropyl-N'-phenyl-p-phenylenediamine concentration of 10000 ppm, and the mixture was extruded from a cylindrical die having a diameter of 26 mm and a slit width of 2.5 mm at a resin temperature of 190° C. using a single screw extruder having a diameter of 40 mm. After the extrusion, the extrudate was extended and pulled into a water bath at 20° C., and solidified to obtain a tube having a diameter of about 6 mm wherein the polymerization inhibitor was contained uniformly. A resident time of the resin in the extruder was about 8 minutes and an extruded pressure was about 70 kg/cm$^2$. The tube was cut into ring packing having a length of about 6 mm.

[Total reflux test]

Same equipment as EXAMPLE 7 was used. To the three neck flask were added 300 g of GMA and 10000 ppm of 2,2'-methylenebis(4-methyl-6-t-butylphenol). The fractionating column was packed with the resultant PP ring packing having a length of 31 cm (16 g) containing the polymerization inhibitor. The oil bath was heated to 140° C. under a pressure of 60 torr at a top of the column. A temperature of a liquid phase was 120° C. and a temperature of a topmost fractionating column was 106° C. to 109° C. The time period needed from the time vapor reached a bottom of PP ring packing until the time polymerization was acknowledged at an area packed with the PP ring was measured. After 3.5 to 4 hours, a white polymerizate was acknowledged at a top of the area packed with the PP ring packing.

COMPARATIVE EXAMPLE 4

[Total reflux test]

Same equipment as EXAMPLE 7 was used. To the three neck flask was added 300 g of GMA containing 10000 ppm of 2,2'-methylenebis(4-methyl-6-t-butylphenol). The fractionating column was packed with McMahon packing (a size of 6 mm, manufactured by Tokyo Special Wire Netting Co., Ltd.) made of SUS316 in a length of 31 cm (15 g). The oil bath was heated under similar conditions to EXAMPLE 8. After 0.5 to 1 hour, a white polymerizate was acknowledged on whole area packed with the McMahon packing.

By using the packing comprising the resin composition for inhibiting polymerization of the vinyl compound of the present invention instead of the conventionally used packing, a polymerization starting time is prolonged in a distillation refining, thereby allowing a long-term stable operation.

EXAMPLE 9

Preparation of a Resin Containing a Polymerization Inhibitor

Polypropylene (a melting point of 146° C., an MI is 5.6 [230° C./2.16 kgf]) was mixed with N-isopropyl-N'-phenyl-p-phenylenediamine at a concentration of 10000 ppm and CsI at a concentration of 10000 ppm, and the mixture was extruded from a cylindrical die having a diameter of 26 mm and a slit width of 2.5 mm at a resin temperature of 190° C. using a single screw extruder having a diameter of 40 mm. After the extrusion, the extrudate was extended and pulled into a water bath at 20° C., and solidified to obtain a tube having a diameter of about 6 mm wherein the polymerization inhibitor was contained uniformly. A resident time of the resin in the extruder was about 8 minutes and an extruded pressure was about 60 kg/cm$^2$. The tube was cut into ring packing having a length of about 6 mm.

[Total reflux test]

In the total reflux test, equipment consisting of a 500 cc three neck flask equipped with a thermometer and a capillary for providing air, a fractionating column (a total length of 398 mm, a packing part length of 315 mm, and an inside diameter of 18.4 mm) with the resultant PP ring packing containing the polymerization inhibitor at a height of 31 cm (18 g), a cooling pipe, a trap cooled with methanol/dry ice and a vacuum pump. A material of the part of the equipment contacted with a liquid was entirely made of glass, a coupling joint was a SPC joint. Heat was applied in an oil bath.

To the three neck flask were added 300 g of GMA and 10000 ppm of 2,2'-methylenebis(4-methyl-6-t-butylphenol). The oil bath was heated to 140° C. under a pressure of 60 torr at a top of the column. A temperature of a liquid phase was 120° C. and a temperature of a topmost fractionating column was 105° C. to 110° C. A temperature of the fractionating pipe was kept at 120° C. using a cylindrical heating mantle. The time period needed from the time vapor reached a bottom of the PP ring packing until the time polymerization was acknowledged at an area packed with the PP ring packing was measured. Even after 14 hours, no polymerizate was acknowledged on the PP ring packing and an area where the PP ring packing existed.

COMPARATIVE EXAMPLES 5

Same equipment as EXAMPLE 9 was used. To the three neck flask were added 300 g of GMA and 10000 ppm of 2,2'-methylenebis(4-methyl-6-t-butylphenol). The fractionating column was packed with Dixon packing (a diameter of 3 mm, manufactured by Tokyo Special Wire Netting Co., Ltd.) made of SUS316 in a height of 31 cm (37 g). The oil bath was heated under similar conditions to EXAMPLE 9. After 0.5 to 1 hour, a white polymerizate was acknowledged on a whole area packed with the Dixon packing.

COMPARATIVE EXAMPLE 6

Same equipment as EXAMPLE 9 was used. To the three neck flask were added 300 g of GMA and 10000 ppm of 2,2'-methylenebis(4-methyl-6-t-butylphenol). The fractionating column was packed with a McMahon packing (a size of 6 mm) made of SUS316 in a length of 31 cm (15 g). The oil bath was heated under similar conditions to EXAMPLE 9. After 0.5 to 1 hour, a white polymerizate was acknowledged on a whole area packed with the McMahon packing.

Then, GMA was synthesized by using methacrylic acid, epichlorohydrin and sodium carbonate as raw materials. A crude reaction liquid of the GMA was batch-distilled. The purities of the crude reaction liquid and refined fraction were represented by a simple area ratio by a gas chromatography analysis.

[Conditions of the chromatography analysis]

Device: GC-14A manufactured by Shimadzu Corporation

Column: capillary column J&W PEG-20M (DBWAX)

Injection temperature: 230° C.

Column temperature: 100° C. to 230° C.; increased at a rate of 4° C./min

Detector temperature: 230° C.

EXAMPLE 10

Preparation of a Resin Containing the Polymerization Inhibitor

The packing were prepared by the same method as EXAMPLE 9.

[Distillation Test]

In the distillation test, used was the equipment consisting of a 500 cc three neck flask equipped with a thermometer and a capillary for providing air, a distillation tower (a height of 102 mm, an inside diameter of 18.4 mm) packed with the above PP ring packing containing the polymerization inhibitor in a length of 72 cm (36 g), a reflux head operated by a solenoid valve, a cooling pipe, a trap cooled with methanol/dry ice and a vacuum pump. A material of the part of the equipment contacted with a liquid was entirely made of glass, a coupling joint was a SPC joint. Heat was applied in an oil bath. To the three neck flask were added 300 g of the crude reaction liquid containing about 75 wt % of GMA and 10000 ppm of 2,2'-methylenebis(4-methyl-6-t-butylphenol). The oil bath was heated to 115° C. under a pressure of 6 torr at a top of the tower. The batch distillation was conducted until about 80 wt % of the crude liquid added was distilled. A temperature of the distillation tower was kept at 75° C. during GMA distillation using a cylindrical heating mantle. A temperature of a liquid phase upon the GMA distillation was 89° C. to 101° C. and a temperature of a top of the distillation tower was 72° C. to 74° C. Entire heating time was 5.4 hours. After the completion of the distillation, the cylindrical heating mantle was detached and the PP ring packing were observed. No polymerizate was acknowledged on the PP ring packing and an area where the PP ring packing existed. The resultant distillate was colorless. Purity of the GMA was 99.3 wt % at the initial cut ratio of distillate of 25 wt % for the charged liquid.

After the distillation test, 300 g of another GMA reaction crude liquid and 10000 ppm of 2,2'-methylenebis(4-methyl-6-t-butylphenol) were placed in the three neck flask to batch-distillate under the same conditions as described above without washing the distillation tower and with the PP ring packing as such. Thus, the batch distillation was conducted sequentially. After the completion of the distillation, the cylindrical heating mantle was detached to observe a production of a polymerizate on the PP ring packing and an area where the PP ring packing existed. As a result, after 13 times of the repeated batch distillation, a white polymerizate was acknowledged on the PP ring packing for the first time. The cumulative total heating time was 71 hours.

COMPARATIVE EXAMPLE 7

Same equipment as EXAMPLE 10 was used. To the three neck flask were added 300 g of a crude reaction liquid, about 75 wt % of GMA and 10000 ppm of 2,2'-methylenebis(4-methyl-6-t-butylphenol). The distillation tower was packed with McMahon packing (a size of 6 mm) made of SUS316 in a height of 72 cm (35 g). The batch distillation was conducted under the same conditions as EXAMPLE 10. During the GMA distillation, another GMA containing 1% of 2,2'-methylenebis(4-methyl-6-t-butylphenol) was provided from a top of the distillation tower so that the distillation tower contained 500 ppm of GMA. As a result, a total heating time was 5.5 hours until the production of a white polymerizate was acknowledged on the packing in the distillation tower.

What is claimed is:

1. Packing for inhibiting polymerization of a vinyl compound in a distillation tower, comprising a resin composition for inhibiting polymerization of the vinyl compound, which composition consists essentially of at least one thermoplastic resin selected from the group consisting of a polyolefin, a fluororesin, a polyester, a polyamide, a polycarbonate and a polyether, and 0.1 to 30% by weight based on said resin of a polymerization inhibitor for the vinyl compound, wherein the vinyl compound is selected from the group consisting of a methacrylic acid, a methacrylic ester, an acrylic acid and an acrylic ester.

2. A method for inhibiting polymerization of a vinyl compound, which comprises a step of contacting the vinyl compound with a packing in a distillation tower, said packing comprising a resin composition consisting essentially of at least one thermoplastic resin selected from the group consisting of a polyolefin, a fluororesin, a polyester, a polyamide, a polycarbonate and a polyether, and 0.1 to 30% by weight based on said resin of a polymerization inhibitor for the vinyl compound at the time of distilling the vinyl compound in the distillation tower.

3. The method for inhibiting polymerization of a vinyl compound according to claim 2, wherein the polymerization inhibitor for the vinyl compound that is substantially gas or vapor is allowed to exist in the distillation tower.

4. The method for inhibiting polymerization of a vinyl compound according to claim 2, wherein the vinyl compound in which the polymerization inhibitor for the vinyl compound is dissolved, is provided from a top of the distillation tower.

5. The method for inhibiting polymerization of a vinyl compound according to claim 2, wherein the polymerization inhibitor for the vinyl compound that is substantially gas or vapor is allowed to exist in the distillation tower, and wherein the vinyl compound in which the polymerization inhibitor for the vinyl compound is dissolved, is provided from a top of the distillation tower.

6. The method for inhibiting polymerization of a vinyl compound according to claim 2, wherein the vinyl compound is selected from the group consisting of methacrylic acid, a methacrylic ester, acrylic acid and an acrylic ester.

7. The packing for inhibiting polymerization of a vinyl compound in a distillation tower according to claim 1, wherein the polymerization inhibitor is included in the resin composition in an amount of 0.2 to 20% by weight based on said resin.

8. The packing for inhibiting polymerization of a vinyl compound in a distillation tower according to claim 1, wherein the polymerization inhibitor is included in the resin composition in an amount of 0.5 to 10% by weight based on said resin.

9. The packing for inhibiting polymerization of a vinyl compound in a distillation tower according to claim 1, wherein said thermoplastic resin is substantially inert to the vinyl compound.

10. The method for inhibiting polymerization of a vinyl compound according to claim 2, wherein said thermoplastic resin is substantially inert to the vinyl compound.

* * * * *